US010062348B2

(12) United States Patent
Huang

(10) Patent No.: US 10,062,348 B2
(45) Date of Patent: Aug. 28, 2018

(54) SCAN DRIVER AND DISPLAY HAVING SCAN DRIVER

(71) Applicant: Shenzhen China Star Optoelectronics Technology Co., Ltd., Shenzhen, Guangdong (CN)

(72) Inventor: Xiaoyu Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 216 days.

(21) Appl. No.: 15/119,698

(22) PCT Filed: May 25, 2016

(86) PCT No.: PCT/CN2016/083322
§ 371 (c)(1),
(2) Date: Aug. 17, 2016

(87) PCT Pub. No.: WO2017/166409
PCT Pub. Date: Oct. 5, 2017

(65) Prior Publication Data

US 2018/0158426 A1 Jun. 7, 2018

(30) Foreign Application Priority Data

Mar. 30, 2016 (CN) .......................... 2016 1 0190076

(51) Int. Cl.
*G06F 3/038* (2013.01)
*G09G 5/00* (2006.01)
*G09G 3/36* (2006.01)

(52) U.S. Cl.
CPC ... *G09G 3/3677* (2013.01); *G09G 2310/0283* (2013.01)

(58) Field of Classification Search
CPC ..................... G09G 3/3677; G09G 2310/0283
See application file for complete search history.

(56) References Cited

U.S. PATENT DOCUMENTS

2008/0170009 A1* 7/2008 Eom .................... G09G 3/3266 345/76
2014/0062979 A1 3/2014 Liu

FOREIGN PATENT DOCUMENTS

| | | | | |
|---|---|---|---|---|
| CN | 102945651 | A | | 2/2013 |
| CN | 202720872 | U | * | 2/2013 |
| CN | 103021309 | A | | 4/2013 |
| CN | 105206246 | A | | 12/2015 |

* cited by examiner

*Primary Examiner* — Srilakshmi K Kumar
*Assistant Examiner* — Brent D Castiaux
(74) *Attorney, Agent, or Firm* — Andrew C. Cheng

(57) ABSTRACT

A scan driver includes: a series-connected N scan driving units; a first switch, a second switch, and a third switch. The control ends of the first switch, the second switch, and the third switch are all connected to the first node. The input ends of the first switch and the second switch receive a scan starting signal. The output end of the first switch is connected to the first scanning driving unit, the output end of the second switch is connected to the Nth scanning driving unit. The input end of the third switch receives a second high-voltage-level signal, the output end of the third switch is connected to a second node and is grounded, and the N scanning driving units are all connected to the second node. Through controlling the voltage level of the first node, the scan driver can achieve bi-directional scanning function.

16 Claims, 2 Drawing Sheets

SCAN DRIVER AND DISPLAY HAVING SCAN DRIVER

BACKGROUND OF THE INVENTION

1. Field of the Invention

The invention relates to a display, and more particularly, to a scan driver and a display having the scan driver.

2. Description of the Prior Art

Among the flat displays, liquid crystal display (LCD) has been widely used in all kinds of electronic devices because of its high space using efficiency, low power consumption, no radiation, and low EM interferences.

A conventional LCD utilizes a scan driver to provide a gate signal to multiple scan lines along a specific scanning direction. However, in some applications, it may require the scan driver to scan along different scan directions. This becomes a technical issue to be solved.

SUMMARY OF THE INVENTION

It is therefore one of the primary objectives of the claimed invention to provide a scan driver to solve the aforementioned problem.

According to an exemplary embodiment of the claimed invention, a scan driver is provided. The scan driver comprises: a series-connected N scan driving units; a first switch, comprising a control end, an input end, and an output end; a second switch, comprising a control end, an input end, and an output end; and a third switch, comprising a control end, an input end, and an output end, wherein the control ends of the first switch, the second switch, and the third switch are all connected to the first node, and the first node receives a first high-voltage-level signal or a first low-voltage-level signal; wherein the input ends of the first switch and the second switch receive a scan starting signal, the output end of the first switch is connected to the first scanning driving unit, the output end of the second switch is connected to the Nth scanning driving unit; and wherein the input end of the third switch receives a second high-voltage-level signal, the output end of the third switch is connected to a second node and is grounded, and the N scanning driving units are all connected to the second node.

Furthermore, the output end of the switch is electrically connected to a ground via a resistor.

Furthermore, the first switch and the third switch are NMOS transistors, and the second switch is a PMOS transistor.

Furthermore, when the scan driver perform a scanning operation in an order from the first scanning driving unit to the Nth driving unit, the first node receives the first high-voltage-level signal.

Furthermore, when the scan driver perform a scanning operation in an order from the Nth scanning driving unit to the first driving unit, the first node receives the first low-voltage-level signal.

Furthermore, the first switch and the third switch are PMOS transistors, and the second switch is a NMOS transistor.

Furthermore, when the scan driver perform a scanning operation in an order from the first scanning driving unit to the Nth driving unit, the first node receives the first low-voltage-level signal.

Furthermore, when the scan driver perform a scanning operation in an order from the Nth scanning driving unit to the first driving unit, the first node receives the first high-voltage-level signal.

Furthermore, the scan driving unit is a scan driving chip on film.

According to an another exemplary embodiment of the claimed invention, a display using the scan driver as provided above is proposed.

In contrast to the related art, an exemplary embodiment of the present invention controls the voltage level of the first node to allow the scan driver to achieve bi-directional scanning function. In addition, this embodiment requires only one scan starting signal output by the signal controller but does not need to set the resistor on the printed circuit board according to the scanning direction. Therefore, the cost is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

These and other objectives of the claimed invention will no doubt become obvious to those of ordinary skill in the art after reading the following detailed description of the preferred embodiment that is illustrated in the various figures and drawings.

In addition, in order to clarify the units, the thickness of areas and layers are larger than the actual size. In addition, the same numbers in the figures are used to represent the same units.

Furthermore, the word "first," "second" and etc. are used to describe the units. However, please note that these words are only used to distinguish the units, not used as limitations of the units.

Figure 1:
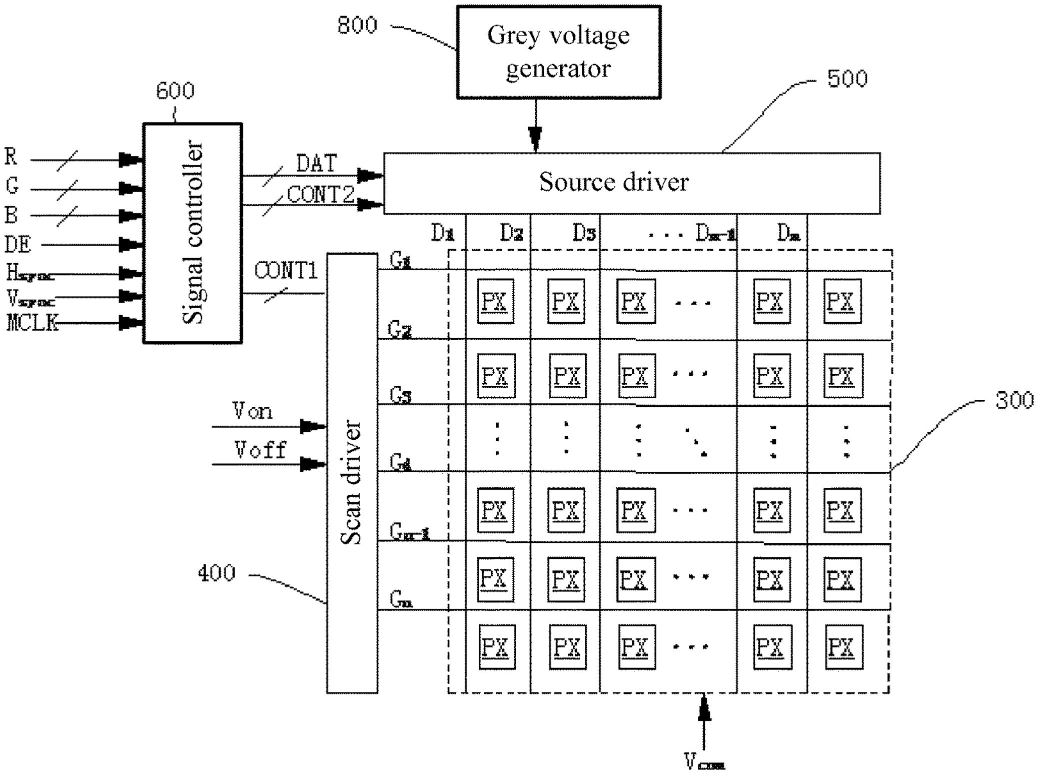
FIG. 1 is a block diagram of an LCD according to an exemplary embodiment.

FIG. 1 is a block diagram of an LCD according to an exemplary embodiment of the present invention.

As shown in FIG. 1, the LCD according to an exemplary embodiment comprises: an LCD panel assembly 300, a scan driver 400, a source driver 500, a grey voltage generator 800, and a signal controller 600. The scan driver 400 and the source driver 500 are electrically connected to the LCD panel assembly 300. The grey voltage generator 800 is electrically connected to the source driver 500. The signal controller 600 is used to control the LCD panel assembly 300, the scan driver 400, the source driver 500, the grey voltage generator 800.

The LCD panel assembly 300 comprises a plurality of signal lines and a plurality of pixels PX, which are connected to the signal lines and arranged in a matrix. The LCD panel assembly 300 may comprise: a lower display panel (not shown), an oppositely-positioned upper display panel (not shown), and a liquid crystal layer (not shown) inserted between the lower display panel and the upper display panel.

In an embodiment, the signal lines can be positioned on the lower display panel. The signal lines may comprise a plurality of scan lines G1-Gn for transferring gate signals and a plurality of data lines D1-Dm for transferring data signals. The scan lines G1-Gn are along the row direction and parallel to each other. The data lines D1-Dm are along the column direction and parallel to each other.

Each of the pixels PC comprises: a switch and a LC capacitor. The switch is connected to the corresponding scan line and data line, and a LC capacitor is connected to the switch. If necessary, each of the pixels PX could also comprise a storage capacitor to parallel connect to the LC capacitor.

The aforementioned switch may be implemented by a three-end unit. Therefore, it comprises a control end connected to the scan line, an input end connected to the data line, and an output end connected to the LC capacitor.

The scan driver 400 is connected to the scan lines G1-Gn and outputs the gate signal to the scan lines G1-Gn. The gate signal may correspond to a high-voltage-level gate signal (called as gate-on voltage Von hereinafter) and a low-voltage-level gate signal (called as gate-off voltage Voff hereinafter) transferred from an external source to the scan driver 400. As shown in FIG. 1, the scan driver 400 is arranged at one side of the LCD assembly 300 and the scan lines G1-Gn are connected to the scan driver 400. However, this arrangement is not a limitation of the present invention. For example, two scan drivers can be positioned in opposite sides of the LCD assembly 300 and the scan lines G1-Gn can be connected to each one of the two scan drivers.

The grey voltage generator 800 generates grey voltages corresponding to the transparent rate of the pixels PX. The grey voltages correspond to a positive value or a negative value because of the common voltage and the grey voltages are provided to each of the pixels PX.

The data driver 500 is connected to the data lines D1-Dm of the LCD assembly 300 and provides the grey voltages generated by the grey voltage generator 80 to the pixels PX as data voltages. If the grey voltage generator 800 merely provides a basic grey voltage instead of providing all grey voltages, the data driver 500 has to divide the basic grey voltage to generate all grey voltages and select one of the all grey voltages as the data voltage for one pixel. In this embodiment, the data driver 500 may be implemented with, but not limited to, the source chip-on-film (S-COF).

The signal controller 600 controls the scan driver 400 and the data driver 500. In this embodiment, the signal controller 600 is formed on the printed circuit board (not shown), and the printed circuit board is electrically connected to the data driver 500. The signal controller 600 receives an image signal (R, B signal) from an external image controller (not shown) and several input control signals for control the display of the image. For example, the input control signals comprise vertical synchronization signal Vsync, horizontal synchronization signal Hsync, main clock signal MCLK, and data enable signal DE. The signal controller 600 processes the input image signal (R, and B) according to the input control signal to generate image data DAT complying with the operation of the LCD assembly 300. Then, the signal controller 600 generates the gate control signal CONT1 and data control signal CONT2, transfers the gate control signal CONT1 to the scan driver 400, and transfers the data control signal CONT2 and image data DAT to the data driver 500.

The gate control signal CONT1 may comprise: a scan start signal STV for starting the operation (scan operation) of the scan driver 400 and a clock signal for controlling when to output the gate-on voltage Von. In addition, the gate control signal CONT may further comprise an enable signal OE for limiting the period of the gate-on voltage Von. The clock signal can be used as a selection signal SE.

The difference between the data voltage of each pixel PX and the common voltage Vcom can be regarded as a pixel voltage for charging the LC capacitor of the pixel PX. The arrangement (rotation) of liquid crystal molecules in the liquid crystal layer changes according to the pixel voltage. In addition, the polarity of the pixels can also be accordingly changed such that the liquid crystal layer changes its transparency.

Figure 2:
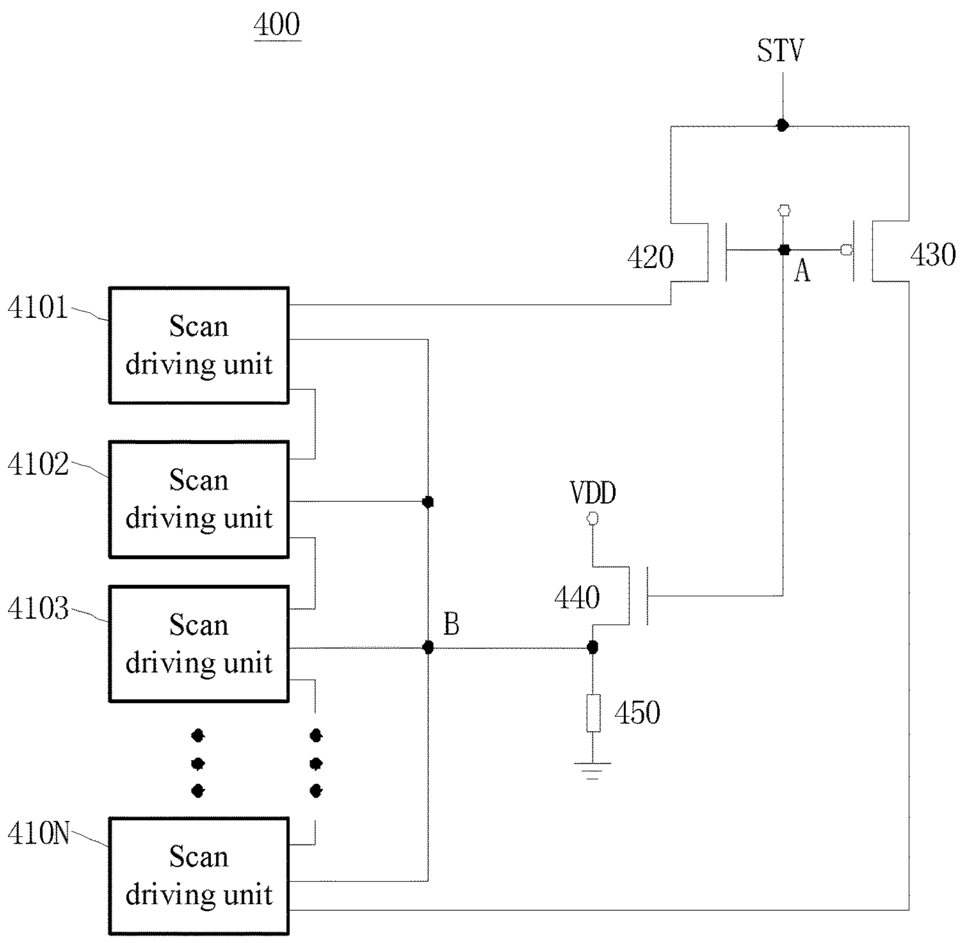
FIG. 2 is a circuit diagram of a scan driver according to an exemplary embodiment.

Please refer to FIG. 2, which is a circuit diagram showing the scan driver according to an exemplary embodiment.

As shown in FIG. 2, the scan driver 400 according to an exemplary embodiment comprises: series-connected N scan driving units 4101, 4102, 4103, . . . , 410N, a first switch 420, a second switch 430, a third switch 440, and a resistor 450. Please note, in this embodiment, the number of the switches is not limited to be three. In the actual implementation, the number of the switches can be more or less.

In this embodiment, the first switch 420, the second switch 430, and the third switch 440 are all three-end units. Therefore, each of the first switch 420, the second switch 430, and the third switch 440 comprises a control end, an input end, and an output end.

The control ends of the first switch 420, the second switch 430, and the third switch 440 are all electrically connected to the first node A. The first node a receives a first high-voltage-level signal or a first low-voltage-level signal according to the type of the first switch 420, the second switch 430, and the third switch 440 and this operation will be illustrated in the following disclosure.

The input ends of the first switch 420 and the second switch 430 are used to receive the scan starting signal STV. The output end of the first switch 420 is connected to the first scan driving unit 4101, and the output end of the second switch 430 is connected to the Nth scan driving unit 410N.

The input end of the third switch 440 is used to receive the second high-voltage-level signal VDD (the voltage level may be, for example but not limited to, 3.3V). The output end of the third switch 440 is connected to the second node B and grounded. The N scan driving units 4101, 4102, 4103, and 410N are all connected to the second node B.

In this embodiment, the output end of the third switch 440 is connected to one end of the resistor 450. The other end of the resistor 450 is grounded. That is, the output end of the third switch 440 is electrically connected to the ground via the resistor 450.

In this embodiment, the first switch 420 and the third switch 440 are NMOS transistors and the second switch 430 is a PMOS transistor.

When the first node A receives the first high-voltage-level signal, the first switch 420 and the third switch 440 are turned on and the second switch is turned off. In this way, the input end of the first switch 420 receives the scan starting signal STV and the second node B corresponds to the second high-voltage-level signal VDD. Therefore, the scanning direction setting signal of the scan driving unit 4101, 4102, 4103, . . . , and 410N is the second high-voltage-level VDD and the scanning operation of the scan driver 400 is performed according to the order from the first scan driving unit 4101 to the Nth scan driving unit 410N.

When the first node A receives the first low-voltage-level signal, the first switch 420 and the third switch 440 are turned off and the second switch 430 is turned on. In this way, the input end of the second switch 430 receives a starting signal STV and the second node B is grounded. Therefore, the scanning direction setting signal of the scan driving unit 4101, 4102, 4103, . . . , and 410N is the second low-voltage-level and the scanning operation of the scan driver 400 is performed according to the order from the Nth scan driving unit 410N to the first scan driving unit 4101.

In another embodiment, the first switch 420 and the third switch 440 are PMOS transistors and the second switch 430 is an NMOS transistor.

When the first node A receives the first high-voltage-level signal, the first switch 420 and the third switch 440 are turned off and the second switch 430 is turned on. In this way, the input end of the second switch 430 receives a starting signal STV and the second node B is grounded. Therefore, the scanning direction setting signal of the scan driving unit 4101, 4102, 4103, . . . , and 410N is the second low-voltage-level and the scanning operation of the scan driver 400 is performed according to the order from the Nth scan driving unit 410N to the first scan driving unit 4101.

When the first node A receives the first low-voltage-level signal, the first switch 420 and the third switch 440 are turned on and the second switch 430 is turned off. In this way, the input end of the first switch 420 receives the scan starting signal STV and the second node B corresponds to the second high-voltage-level signal VDD. Therefore, the scanning direction setting signal of the scan driving unit 4101, 4102, 4103, . . . , and 410N is the second high-voltage-level VDD and the scanning operation of the scan driver 400 is performed according to the order from the first scan driving unit 4101 to the Nth scan driving unit 410N.

From the above, through controlling the voltage level of the first node, the scan driver can achieve bi-directional scanning function. In addition, this embodiment requires only one scan starting signal output by the signal controller but does not need to set the resistor on the printed circuit board according to the scanning direction. Therefore, the cost is reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scan driver comprising:

a series-connected N scan driving units;

a first switch, comprising a control end, an input end, and an output end;

a second switch, comprising a control end, an input end, and an output end; and a third switch, comprising a control end, an input end, and an output end, wherein the control ends of the first switch, the second switch, and the third switch are all connected to the first node, and the first node receives a first high-voltage-level signal or a first low-voltage-level signal;

wherein the input ends of the first switch and the second switch receive a scan starting signal, the output end of the first switch is connected to the first scanning driving unit, the output end of the second switch is connected to the Nth scanning driving unit; and wherein the input end of the third switch receives a second high-voltage-level signal, the output end of the third switch is connected to a second node and is grounded, and the N scanning driving units are all connected to the second node.

2. The scan driver of claim 1, wherein the output end of the switch is electrically connected to a ground via a resistor.

3. The scan driver of claim 1, wherein the first switch and the third switch are NMOS transistors, and the second switch is a PMOS transistor.

4. The scan driver of claim 2, wherein the first switch and the third switch are NMOS transistors, and the second switch is a PMOS transistor.

5. The scan driver of claim 3, wherein when the scan driver perform a scanning operation in an order from the first scanning driving unit to the Nth driving unit, the first node receives the first high-voltage-level signal.

6. The scan driver of claim 4, wherein when the scan driver perform a scanning operation in an order from the first scanning driving unit to the Nth driving unit, the first node receives the first high-voltage-level signal.

7. The scan driver of claim 3, wherein when the scan driver perform a scanning operation in an order from the Nth scanning driving unit to the first driving unit, the first node receives the first low-voltage-level signal.

8. The scan driver of claim 4, wherein when the scan driver perform a scanning operation in an order from the Nth scanning driving unit to the first driving unit, the first node receives the first low-voltage-level signal.

9. The scan driver of claim 1, wherein the first switch and the third switch are PMOS transistors, and the second switch is a NMOS transistor.

10. The scan driver of claim 2, wherein the first switch and the third switch are PMOS transistors, and the second switch is a NMOS transistor.

11. The scan driver of claim 9, wherein when the scan driver perform a scanning operation in an order from the first scanning driving unit to the Nth driving unit, the first node receives the first low-voltage-level signal.

12. The scan driver of claim 10, wherein when the scan driver perform a scanning operation in an order from the first scanning driving unit to the Nth driving unit, the first node receives the first low-voltage-level signal.

13. The scan driver of claim 9, wherein when the scan driver perform a scanning operation in an order from the Nth scanning driving unit to the first driving unit, the first node receives the first high-voltage-level signal.

14. The scan driver of claim 10, wherein when the scan driver perform a scanning operation in an order from the Nth scanning driving unit to the first driving unit, the first node receives the first high-voltage-level signal.

15. The scan driver of claim 1, wherein the scan driving unit is a scan driving chip on film.

16. A display, comprising a scan driver, the scan driver comprising:

a series-connected N scan driving units;

a first switch, comprising a control end, an input end, and an output end;

a second switch, comprising a control end, an input end, and an output end; and a third switch, comprising a control end, an input end, and an output end, wherein the control ends of the first switch, the second switch, and the third switch are all connected to the first node, and the first node receives a first high-voltage-level signal or a first low-voltage-level signal;

wherein the input ends of the first switch and the second switch receive a scan starting signal, the output end of the first switch is connected to the first scanning driving unit, the output end of the second switch is connected to the Nth scanning driving unit; and wherein the input end of the third switch receives a second high-voltage-level signal, the output end of the third switch is connected to a second node and is grounded, and the N scanning driving units are all connected to the second node.

* * * * *